No. 845,851. PATENTED MAR. 5, 1907.
J. M. CASE.
APPARATUS FOR DISINTEGRATING SOFT MIDDLINGS.
APPLICATION FILED AUG. 23, 1905.
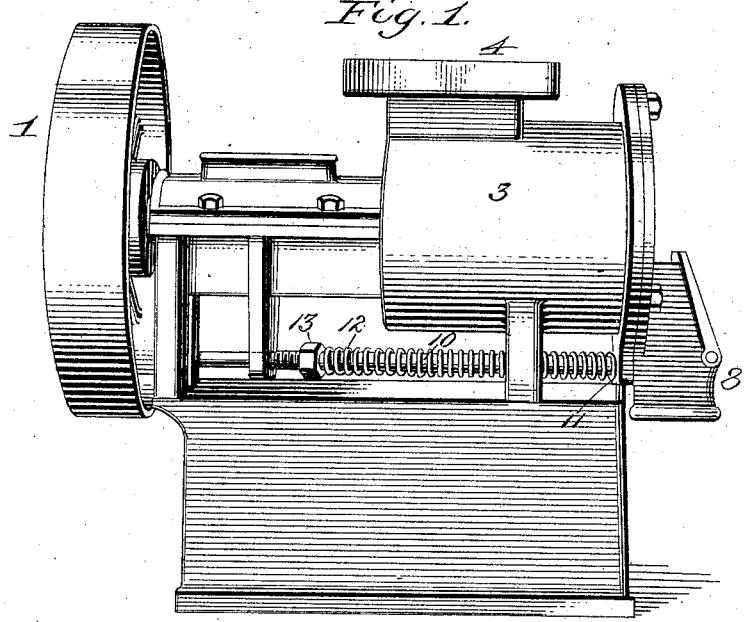
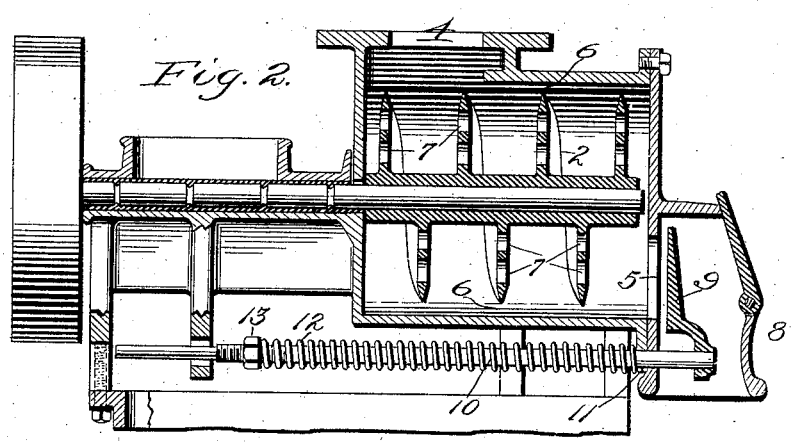
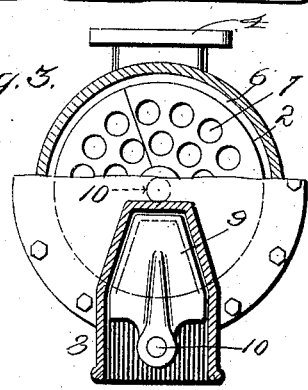

UNITED STATES PATENT OFFICE.

JOHN MURRAY CASE, OF LOUISVILLE, KENTUCKY, ASSIGNOR TO THE J. M. CASE MILL MFG. CO., OF LOUISVILLE, KENTUCKY, A CORPORATION OF KENTUCKY.

APPARATUS FOR DISINTEGRATING SOFT MIDDLINGS.

No. 845,851.   Specification of Letters Patent.   Patented March 5, 1907.

Application filed August 23, 1905. Serial No. 275,466.

*To all whom it may concern:*

Be it known that I, JOHN MURRAY CASE, a citizen of the United States, residing in Louisville, in the county of Jefferson and State of Kentucky, have invented certain new and useful Improvements in Apparatus for Disintegrating Soft Middlings, of which the following is a specification.

In gradual-reduction milling there is found near the finishing department of the mill a product resulting from close grinding on the rolls incident to making a complete finish—a soft flaky stock—embodying quite a large percentage of the middlings and in such shape that it will not pass through the ordinary bolting-silk, but tails over into the feed-pile or into a discharge, through which it is sent to a centrifugal reel to be broken up by severe beating. If this soft flaky stock passes to feed, it is of course practically wasted. If it goes to the centrifugal reel, the severe beating action there received not only disintegrates it, but breaks the grain to such an extent as to seriously reduce its rising qualities and at the same time disintegrates impurities sufficiently to cause a large percentage to pass through the machine with the flour and make it a second-grade product. Efforts have been made to handle this soft flaky stock by a machine known as a "scroll-mill," comprising a cylinder containing a scroll or spiral which forces the material forward against a yielding cylinder-head, where it is rubbed and the flakes crushed; but in this class of machines the germ and flattened bran have also been disintegrated sufficiently to sift out and combine with the flour to such an extent as to reduce the market value of the product. This method of disintegrating also breaks the grain of the flour and reduces its rising qualities. I have discovered that if this flattened or flaky stock can be circulated within itself under a very gentle pressure, so that the flakes or flattened particles are constantly shifting their positions and receiving pressure upon their edges and in constantly-changing directions, the flattened particles or flakes are disintegrated without disintegration of the germ or flattened bran particles and without destroying the grain of the flour, and the disintegrated material thus produced can be sifted out to produce a so-called "high-grade" patent-flour with a very large increase in the yield of the mill. In accomplishing this result I employ a cylinder having a loosely-fitting agitator in the form of a spiral, which fits within the cylinder with sufficient looseness to leave a suitable space between its periphery and the inner wall of the cylinder, through which the material may circulate or move relatively to the body of stock that is being driven forward by the agitator, and I also provide the outlet for the cylinder below the axis of the agitator, so that the material which escapes is largely the disintegrated portion of the middlings, which naturally settles toward the bottom. The end convulute, at least, and, if desired, other convolutes in rear thereof, are provided with bores parallel to the axis of the agitator through which the material may escape, and thus increase the circulation. By this method of proceeding all rubbing of the stock between the end of the agitator or scroll and the end of the cylinder is avoided, and the consequent flattening of the flour incident to machines as heretofore constructed is done away with.

My invention will be fully understood upon reference to the accompanying drawings, in which—

Figure 1 is a perspective view of my machine. Fig. 2 is a vertical sectional view of the same, and Fig. 3 is an end elevation with part of the head broken away to show the construction of the agitator within.

1 represents a drive-pulley mounted upon the shaft of the agitator 2 within a cylinder 3. The stock enters through an opening 4 and escapes through a valved outlet 5. The difference between the internal diameter of the cylinder 3 and the external diameter of the agitator 2 is such as to leave passageways 6 around the agitator, through which the material may move backward or in which it may remain stationary a part of the time, or at least be in a state of motion or rest such as will produce relative motion between it and the material being forwarded by the agitator. The agitator is provided with perforations 7 through at least the end convolute, and, if desired, through other convolutes, through which material may circulate or move backward after it reaches the end of the machine, and thus assist in keeping up the circulation within the stock, which is relied upon to produce the desired results.

The discharge-opening 5 is below the horizontal axis of the machine and is also somewhat restricted laterally. It is covered by a shield 8 and guarded by a valve 9, which moves bodily to and from its seat over the opening and maintains a position parallel to the opening at all times. To secure this relation between the valve and the opening, the valve is mounted on a rod 10, which slides in a bearing 11 in the fixed part of the machine, and to hold the valve to its seat with a yielding pressure the rod 10 is surrounded by a spring 12, which abuts at one end against the bearing 11 and at its other end against a shoulder on the rod, which for the purpose of adjusting the tension of the spring is in the form of a nut 13. By adjusting the nut 13 on the rod 10 the pressure with which the valve resists the escape of the material may be regulated at will, and the severity of the abrading effect due to circulation may be accordingly modified at will. Ordinarily I put a very light tension on this spring, so that the valve readily yields to the small pressure of the cylinder within and permits the disintegrating stock to pass out under the valve and be discharged into the bolting apparatus. It will be seen that by discharging this stock at one point instead of around the entire head, as in other mills made for this purpose, there must necessarily be a rolling or intermingling of the stock in order to reach this one point of exit, whereas if the head or valve is made the entire diameter of cylinder there is no such rolling or intermingling action; but the stock in such machines is held firmly against the end at one position until by the pressure it is forced out in all directions, and by making this outlet below the horizontal axis of the machine the stock escaping therethrough is mostly the reduced material, which naturally finds its way toward the bottom. It will also be seen that by forming these holes around the scroll-worm that there will necessarily be a continuous circulation of the stock, which produces the effect of breaking up the flakes, as hitherto explained.

Having thus described my invention, what I claim, and desire to secure by Letters Patent, is—

1. In a soft-middlings disintegrator, the combination with a cylinder, of a continuous scroll or spiral rotatably mounted within the cylinder, spaced from the walls of the cylinder at its periphery, and having openings through which the material may escape backward, and an outlet for the cylinder arranged wholly at one side of the axis of the scroll or spiral.

2. In a soft-middlings disintegrator, the combination with a cylinder, of a continuous scroll or spiral rotatably mounted within the cylinder, spaced from the walls of the cylinder at its periphery, and having openings through which the material may escape backward, and a yielding discharge for the cylinder at one end of the scroll or spiral.

3. In a soft-middlings disintegrator, the combination with a cylinder of a continuous scroll or spiral, rotatably mounted within the cylinder, spaced from the walls of the cylinder at its periphery and having openings through which the material may escape, and means retarding the discharge from the cylinder.

The foregoing specification signed at Washington, District of Columbia, this 13th day of July, 1905.

JOHN MURRAY CASE.

In presence of—
HERVEY S. KNIGHT,
EDWIN S. CLARKSON.